(12) United States Patent
Zhu

(10) Patent No.: US 6,201,056 B1
(45) Date of Patent: Mar. 13, 2001

(54) CROSSLINKED FLUOROALIPHATIC COATING COMPOSITION HAVING OXAZOLINE OR OXAZINE MOIETIES AND INTEGRATED COLLOIDAL SILICA

(75) Inventor: Dong-Wei Zhu, Woodbury, MN (US)

(73) Assignee: 3M Innovative Properties Company, St. Paul, MN (US)

(*) Notice: Subject to any disclaimer, the term of this patent is extended or adjusted under 35 U.S.C. 154(b) by 0 days.

(21) Appl. No.: 09/434,733

(22) Filed: Nov. 5, 1999

Related U.S. Application Data

(60) Division of application No. 08/752,275, filed on Nov. 20, 1996, now Pat. No. 6,005,043, which is a continuation-in-part of application No. 08/494,157, filed on Jun. 23, 1995, now Pat. No. 5,608,003.

(51) Int. Cl.$^7$ .............................. C08K 3/36; C08L 27/12; C08L 39/04
(52) U.S. Cl. ..................... 524/493; 524/516; 524/520; 524/522
(58) Field of Search ................................. 524/520, 493, 524/522, 516

(56) References Cited

U.S. PATENT DOCUMENTS

| | | | |
|---|---|---|---|
| 4,764,564 | 8/1988 | Schmidt et al. | 525/328.2 |
| 4,929,666 | 5/1990 | Schmidt et al. | 524/516 |
| 5,006,624 | 4/1991 | Schmidt et al. | 526/243 |
| 5,073,404 | 12/1991 | Huang | 427/39 |
| 5,284,900 * | 2/1994 | Izubayashi et al. | 524/492 |
| 5,294,662 * | 3/1994 | Moore et al. | 524/516 |
| 5,324,566 | 6/1994 | Ogawa et al. | 428/141 |
| 5,328,768 | 7/1994 | Goodwin | 428/428 |
| 5,350,795 | 9/1994 | Smith et al. | 524/507 |
| 5,370,919 | 12/1994 | Fleuws et al. | 428/96 |
| 5,382,639 | 1/1995 | Moore et al. | 526/243 |
| 5,407,709 | 4/1995 | Ogawa et al. | 427/539 |
| 5,437,894 | 8/1995 | Ogawa et al. | 427/535 |
| 5,608,003 * | 3/1997 | Zhu | 524/516 |
| 5,760,126 * | 6/1998 | Engle et al. | 524/516 |

OTHER PUBLICATIONS

Ralph K. Iler, "Uses of Colloidal Silicas," The Chemistry of Silica, Solubility, Polymerization, Colloid and Surface Properties, and Biochemistry, John Wiley & Sons, pp. 415–461, New York (1979).

Larry N. Lewis and Dimitris Katsamberis, "Ultraviolet–Curable, Abrasion–Resistant, and Weatherable Coatings with Improved Adhesion," Journal of Applied Polymer Science, 42, pp. 1551–1556 (1991).

Takeo Saegusa & Yoshiki Chujo, "Organic–Inorganic Polymer Hybrids," Makromol. Chem., Macromol. Symp., 64, pp. 1–9 (1992).

Donald L. Schmidt et al., "Water–based non–stick hydrophobic coatings", Nature, 368, pp. 39–41, Mar. 3, 1994.

Tsubokawa, N. et al., "Polymerization of Vinyl Monomers in the Presence of Silica having Surface Functional Groups," Colloid and Polymer Science, 271, pp. 940–946, (1993).

Zisman, W.A., in "Contact Angle, Wettability, and Adhesion," Advances in Chemistry, Series 43, American Chemical Society, Washington, D.C. (1964).

* cited by examiner

*Primary Examiner*—David W. Wu
*Assistant Examiner*—K C Egwim
(74) *Attorney, Agent, or Firm*—Lucy C. Weiss

(57) ABSTRACT

Coatings prepared from water-based compositions comprise an aqueous solution, emulsion, or dispersion of (a) a water-soluble or water-dispersible polymer or oligomer having at least one anionic moiety which is capable of reacting with an oxazoline or oxazine moiety; (b) a water-soluble or water-dispersible polymer or oligomer having at least one oxazoline or oxazine moiety; and (c) colloidal silica; at least one of the components (a) and (b) further comprising at least one fluoroaliphatic moiety. The coatings have low surface energy and high abrasion resistance.

10 Claims, No Drawings

US 6,201,056 B1

CROSSLINKED FLUOROALIPHATIC COATING COMPOSITION HAVING OXAZOLINE OR OXAZINE MOIETIES AND INTEGRATED COLLOIDAL SILICA

This application is a divisional of 08/752,275 filed Nov. 20, 1996, now U.S. Pat. No. 6,005,043 which is a continuation-in-part of application No. 08/494,157 filed Jun. 23, 1995 now U.S. Pat. No. 5,608,003.

FIELD OF THE INVENTION

This invention relates to water-based, one-part, shelf-stable coating compositions made from organic and inorganic materials. The organic materials contain fluorine and offer low surface energy properties. The addition of inorganic materials such as colloidal silica provides abrasion-resistant coatings without adversely affecting the low surface energy properties.

BACKGROUND OF THE INVENTION

Water-based, cross-linkable, fluorochemical low surface energy coating systems made from polymeric surfactants and oxazoline polymer crosslinkers have been described in U.S. Pat. Nos. 5,382,639, 5,294,662, 5,006,624, and 4,764,564.

The present invention has filled a void in providing a low surface energy hard coating system with excellent abrasion resistance. This void has been filled by providing a coating system which integrates a fluorine-containing, crosslinked organic polymeric surfactant with colloidal silica.

SUMMARY OF THE INVENTION

Accordingly, the present invention is a water-based composition comprising an aqueous solution, emulsion, or dispersion of: (a) a water-soluble or water-dispersible polymer or oligomer having at least one anionic moiety which is capable of reacting with an oxazoline or oxazine moiety; (b) a water-soluble or water-dispersible polymer or oligomer having at least one oxazoline or oxazine moiety; and (c) colloidal silica. At least one of polymers or oligomers (a) and (b) has at least one fluoroaliphatic moiety, and either polymer or oligomer (a) or (b) (or both) can further contain at least one silyl moiety. Preferably, the fluorine content of the composition is at least about 10 weight percent.

Thus, for example, an especially preferred embodiment in a water-based composition includes an aqueous solution, emulsion, or dispersion of (a) a water-soluble or water-dispersible polymer or oligomer having interpolymerized units derived from at least one fluoroaliphatic-radical containing acrylate, at least one carboxy-containing monomer, and at least one silyl moiety derived from a trialkoxysilylalkyl acrylate or methacrylate or trialkoxysilylalkyl mercaptan in which alkyl has from 1 to about 10 carbon atoms and alkoxy has from 1 to about 3 carbon atoms;

(b) a water-soluble or water-dispersible polymer or oligomer having at least one oxazoline or oxazine moiety; and (c) colloidal silica having an average particle diameter of at least about 5 nanometers.

A second aspect of the invention is a coating comprising the cured composition, which comprises crosslinked polymer (e.g., containing at least one amide-ester crosslink moiety derived from the reaction of carboxyl groups with oxazoline or oxazine moieties) having colloidal silica integrated therein.

A third aspect of the present invention is a coated article comprising the coating.

The coating compositions can be used to provide a low surface energy hard coat to protect smooth, flat surfaces of essentially any kind (e.g., poly(vinyl chloride), polycarbonate, polyester, nylon, metals (either painted or bare), glass, wood, stone, etc.). The good abrasion resistance properties will protect such surfaces from physical damage, and the low surface energy properties will provide easily cleanable and possibly antigraffiti properties. The coating can also be used as a low adhesion backsize for adhesives.

The significant difference of the present invention over related technologies is the incorporation of colloidal silica into the coating composition. The previous organic polymer-based coating systems have been transformed into organic-inorganic composite compositions. The finished coatings therefore become much more abrasion-resistant and are more durable in protective applications. Unexpectedly, the antigraffiti and release properties of the coating systems are also not degraded despite the incorporation of the high surface energy, hydrophilic, colloidal silica, even with compositions containing a lower weight percentage of fluorine in many cases.

DETAILED DESCRIPTION OF THE INVENTION

As used herein "anionic" means capable of forming anions in aqueous media. As used herein, "copolymers" or "polymers" includes polymers and oligomers.

The anionic moiety-containing polymers useful in this invention preferably have an average of more than two reactive ionic moieties per polymer. Preferably, the anionic moiety-containing polymers have an average of more than one fluoroaliphatic moiety per polymer. Such polymers include those described, for example, in U.S. Pat. Nos. 5,382,639, 5,294,662, 5,006,624 and 4,764,564 supra, which descriptions are incorporated herein by reference.

Useful anionic moieties include carboxy and mercaptan moieties, which can be reacted with bases to obtain carboxylate and mercaptide salts. At lower pH values, these moieties become essentially nonionic. The particularly preferred anionic moiety is carboxylate. The carboxylate anionic polymer can be utilized in the water-based compositions of this invention as its ammonium salts.

The anionic moiety-containing polymers, polymer component, or surfactant, useful in the present invention, can be prepared, for example, by the addition polymerization of one or more ethylenically unsaturated carboxy-containing monomers (e.g., acrylic acid, methacrylic acid, and esters thereof such as 2-carboxyethyl acrylate) with one or more ethylenically unsaturated comonomers (e.g., acrylic esters, vinyl ethers, or styrenic monomers). The comonomers can be further substituted with fluorine. The carboxy-containing monomer is preferably acrylic acid (due to stability considerations) or 2-carboxyethyl acrylate (due to crosslinking considerations). Preferably, the anionic moiety-containing polymers further contain a fluoroaliphatic radical-containing, ethylenically unsaturated monomer, such as perfluoroalkyl acrylate esters, e.g., $CH_2=CHCOOCH_2CH_2N(Et)SO_2C_8F_{17}$, or fluoroalkyl vinyl ethers, e.g., $CH_2=CHOCH_2C_7F_{15}$, which can be incorporated into the anionic moiety-containing polymer by addition polymerization.

The oxazine or oxazoline polymers or oligomers useful in the present invention can be prepared by the addition polymerization of an oxazine-or oxazoline-containing ethylenically unsaturated monomer, such as 2-isopropenyl-2-oxazoline (IPO) and those represented by the general structures:

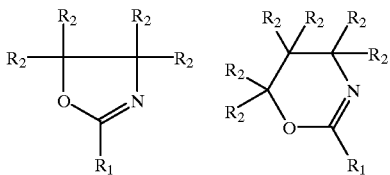

wherein $R_1$ is an unsaturated organic radical capable of addition polymerization, such as 1,2-ethylenic unsaturation. Preferably, $R_1$ is an isopropenyl group. Each $R_2$ is independently hydrogen, halogen, or a substituted organic radical, preferably $R_2$ is hydrogen. Optionally an aliphatic or fluoroaliphatic radical-containing, ethylenically unsaturated monomer, such as acrylate esters, e.g., $CH_2=CHCO_2CH_2CH_2N(Et)SO_2C_8F_{17}$, vinyl ether, or styrenic monomers can be copolymerized with the oxazine- or oxazoline-containing ethylenically unsaturated monomer.

The oxazoline- or oxazine-containing polymers useful in the present invention preferably have an average of more than two oxazoline or oxazine moieties per polymer. If desired, aziridine group-containing oligomers can be utilized in place of the oxazoline- or oxazine-containing polymers or oligomers, provided that shelf stability or one-part formulation is not required.

The aliphatic moiety of the aliphatic radical-containing monomer, if present, can be a monovalent aliphatic or alicyclic moiety, preferably saturated. It can be linear, branched, cyclic, or combinations thereof. It can contain catenary, i.e., in-chain, heteroatoms bonded only to carbon atoms, such as oxygen, divalent or hexavalent sulfur, or nitrogen. The aliphatic moiety has from 1 to about 20 carbon atoms, preferably from 1 to about 10 carbon atoms.

The fluoroaliphatic moiety of the fluoroaliphatic radical-containing monomer, if present, can be a fluorinated, stable, inert, preferably saturated, non-polar, monovalent aliphatic or alicyclic moiety. It can be straight chain, branched chain, cyclic, or combinations thereof. It can contain catenary heteroatoms, bonded only to carbon atoms, such as oxygen, divalent or hexavalent sulfur, or nitrogen. A fully-fluorinated moiety is preferred but hydrogen or chlorine atoms can be present as substituents, provided that not more than one atom of either is present for every two carbon atoms. The moiety has at least about 3 carbon atoms, preferably from about 3 to about 20 carbon atoms, and most preferably from about 4 to about carbon atoms. The terminal portion of the moiety is a perfluorinated moiety which preferably contains at least 7 fluorine atoms, e.g., $CF_3CF_2CF_2-$, $(CF_3)_2CF-$, $F_5SCF_2-$, or the like.

The polymers useful in this invention, i.e., those having at least one anionic moiety (the surfactant component), or those having at least one oxazoline or oxazine moiety (the cross-linking component), can optionally contain at least one silyl moiety. The silyl moiety can be formed on one or both of the polymers by a compound which can be represented by the formula X—R—Si(OR')$_3$ wherein X is a group reactive to radical polymerization, such as an unsaturated acrylate or methacrylate radical or a mercapto group; R is alkylene of 1 to about 10 carbon atoms; and R' is alkyl of 1 to about 3 carbon atoms.

The silyl moiety can be incorporated either in the polymer chain, using, for example, a trialkoxysilylalkyl acrylate or methacrylate, or at the terminal end of the polymer chain via a chain transfer agent, using, for example, a trialkoxysilylalkyl mercaptan, preferably mercaptopropyltrimethoxysilane (MPTS). The silane content of the resulting polymer can vary up to a level where significant silane coupling occurs, resulting in destabilization of the composition. For example, the amount can range from about 0.1 to about 15 weight % based on the weight of the total monomer feed. Preferably, the silyl moiety is attached to the surfactant component, the anionic moiety-containing polymer.

Other functional groups can optionally be incorporated into the surfactant or cross-linking polymer components, such as polymerizable ultraviolet (UV) absorbers, e.g., NORBLOC™ 7966 (2-(2'-)hydroxy-5-methacryloyloxyethylphenyl)-2H-benzotriazole), available from Noramco Inc.

Aqueous colloidal silica dispersions (silica hydrosols) are available commercially with different particle sizes (average particle diameters) and can be used in preparing the compositions of the invention. The useful particle size for the present invention generally ranges from about 1 nanometer to about 1 micrometer, preferably, at least about 5 nanometers (nm), more preferably from about 20 to about 75 nm. The use of particles larger than 75 nm may result in the crosslinked coating becoming translucent or even opaque, in contrast to the use of particle sizes in the preferred range which result typically in transparent coatings. The use of larger particle sizes however will not diminish the low surface energy properties of the coating, and will impart improved abrasion resistance. Particle sizes of less than about 5 nm can degrade the low surface energy properties at relatively low loading levels due to the large surface area for a given added weight of colloidal silica.

The commercially available colloidal silica hydrosols generally contain from about 15 to about 50 weight % silica. Most are stabilized by alkali, e.g., sodium, potassium, or ammonium hydroxides. Examples of sols which have been found useful include: Nalco™ 2327 and Nalco™ 2329 silica hydrosols, having colloidal silica particle sizes of about 20 and 75 nm respectively and a concentration of 40 weight percent silica in water, available from Nalco Chemical Company of Oakbrook, Ill. Both are suspended in alkaline aqueous media. Another useful dispersion is LUDOX™ AS-40 silica hydrosol, which uses ammonium as a stabilizing counterion, having a particle size of about 22 nm and a concentration of 40 weight % silica in water, available from E. I. duPont de Nemours of Wilmington, Del.

Other inorganic oxides (e.g., colloidal titania, colloidal alumina, colloidal zirconia, colloidal vanadia, colloidal chromia, colloidal iron oxide, colloidal antimony oxide, colloidal tin oxide, colloidal alumina-coated silica, and mixtures thereof) can also be utilized in the compositions of the invention (either alone or in combination with silica), provided that they can form stable dispersions with the polymeric components of the compositions.

The surfactant polymer component, crosslinking polymer component, and silica hydrosol can be combined in any order and manner of combination by direct mixing using any conventional means such as mechanical agitation, ultrasonic agitation, stirring, and the like. For example, silica hydrosol can be added to the combined polymer formulation, i.e., a mixture of the surfactant polymer component and the crosslinking polymer component, or prior to formulation to either the surfactant polymer component or the crosslinking polymer component. Preferably, the crosslinking component and/or the surfactant component are added to the silica hydrosol while maintaining the pH of the mixture at values greater than 8 to avoid precipitation of one or more of the components.

Silica hydrosol can be added in an amount sufficient to impart the degree of abrasion resistance desired for a particular application, while maintaining the desired surface energy characteristics. Preferably, the coating formulation contains from about 5 to about 70 weight percent silica. At high weight percentages, for example, from about 50 to about 70 weight %, or with very fine particle sizes, for example, less than about 5 nm, the abrasion resistance of the resulting coating is improved, but the low energy surface properties may be reduced compared with a coating containing no silica. More preferably, silica is added in amounts of from about 15 to about 50 weight percent; most preferably, from about 15 to about 40 weight percent.

The coating composition can contain additional components such as fillers. Thus, for example, should transparency of the coating not be a requirement, e.g., in paints, etc., the composition can contain dyes; inorganic, non-colloidal fillers such as tin oxide, titanium dioxide, alumina, or alumina-coated silica; non-colloidal silica (e.g., fumed silica); carbon black; and/or organic fillers.

The coating composition can be cured at elevated and room temperatures, e.g., from about 20 to about 125° C. The use of elevated temperatures, e.g., 50° C. to 125° C., results in faster cure and is preferred.

The cured coatings are transparent, translucent, or opaque, depending on the colloidal silica particle size and whether additional components such as fillers have been incorporated. The cured coatings are resistant to solvents and water, and have excellent abrasion resistance without sacrificing their very low surface energy (10–15 dynes/cm) properties.

The coating compositions of this invention can be applied to a wide variety of substrates to impart abrasion resistance, solvent resistance, and corrosion resistance, as well as to impart release characteristics to the surface. In general, the type of substrates that can be coated in accordance with this invention include rigid and flexible substrates such as: plastics, glass, metal, and ceramics. For example, soft substrates such as plastics can be rendered abrasion resistant and mar resistant by the practice of this invention. Representative examples include: lenses used in ophthalmic spectacles, sunglasses, optical instruments, illuminators, watch crystals, and the like; plastic window glazing; signs and decorative surfaces such as wallpaper and vinyl flooring. Metal surfaces can be rendered resistant to corrosion by the practice of this invention, whereby the brilliance of polish can be maintained on decorative metal strips and mirrors. Further, the coating compositions can be colored by addition of dyes and pigments and applied to surfaces as a paint.

In addition, the coating composition can be applied as a protective coating on aircraft (in de-icing wings), as automotive polish, as automotive topcoat, and as automotive transit coating; can be used on carpet, concrete, fishing line, formica, medical surfaces, siding, sinks, showers, textiles, vinyl flooring, and wallcovering; and can be used in food release, mold release, adhesive release, and the like.

The coating compositions of this invention can be applied to a substrate using any conventional technique. For example, the composition can be brushed or sprayed (e.g., as an aerosol) onto a substrate, or the substrate can be immersed in the coating composition or can be spin-coated. When coating flat substrates, it is preferable to knife- or bar-coat the substrate to ensure uniform coatings.

The coating compositions of the present invention can be applied to a substrate in any desired thickness. It has been found that coatings as thin as a few microns offer excellent abrasion resistance and low surface energy. However, thicker coatings (e.g., up to about 20 microns or more) can be obtained by applying a single thicker coating or by applying successive layers of the coating to the substrate. The latter can be done by applying a layer of the coating composition to the substrate and then drying without extensive curing, for example, by heating the coated substrate for about one minute at about 75° C. Successive layers of the coating can then be applied to dried, but uncured, coatings. This procedure can be repeated until the desired coating thickness is obtained.

Objects and advantages of this invention are further illustrated by the following examples, but the particular materials and amounts thereof recited in these examples, as well as other conditions and details, should not be construed to unduly limit this invention. In the examples, all temperatures are in degrees Centigrade and all parts and percentages are by weight unless indicated otherwise.

EXAMPLES

In the following examples and comparative examples (controls), the precursor polymers such as for example the surfactant component polymer and the crosslinking component polymer were prepared essentially as described in U.S. Pat. Nos. 5,382,639, 5,294,662, 5,006,624, and 4,764,564 cited above. The coating compositions were prepared, applied to a polyethylene terephthalate film substrate, cured, and evaluated for low surface energy properties and abrasion resistance performance. The results are shown in Tables 1 and 2, and the test methods utilized are described below:

The "pen test" described in U.S. Pat. No. 5,294,662 was used. The test involved drawing a fine line on a coated film using a black Sharpie™ fine point permanent marker available from the Sanford Company. A number value of 0 to 3 was assigned based on the appearance of the resulting line. The values were defined as follows: 3: totally unwettable, ink dewets to form a discontinuous line (best); 2: ink partially dewets to form a very thin continuous line; 1: some dewetting; 0: totally wettable, same as non-treated surface (worst). For illustration of the method, a line written on a polytetrafluoroethylene surface dewets slightly and is assigned a 1.

The abrasion resistance of the coatings was determined by measuring the resulting % haze of a film sample using ASTM D-1044-90 on a Teledyne Tabor Abrasor with a 500 g load and a pair of CS-10F Calibrasers. The lower the resulting percent haze, the higher the abrasion resistance of the coating.

The resulting coatings were also tested for water contact angle by essentially the method described by Zisman, W. A., in "Contact Angle, Wettability, and Adhesion," Advances in Chemistry, Series 43, American Chemical Society, Washington, D.C. (1964). An ESCA test comprised evaluating the samples for surface fluorine content using a ¼ by ¼ inch portion of the coated sample using a Fison F Inspector™ ESCA analyzer. The sample was scanned from 0 electron volts to 1100 electron volts, and the results were averaged for four scans.

Comparative Example 1

To a 5 L 3-necked flask equipped with a mechanical stirrer, a cooling condenser, and a temperature control device was added 2-(N-ethylperfluorooctanesulfonamido)

ethyl acrylate (600 g, available as FX-13™ acrylate from the 3M Company), 2-carboxyethyl acrylate (400 g), azobis-isobutyrylnitrile (AIBN, 6.0 g), N-methylpyrrolidinone (400 g), and isopropanol (600 g). The solution was purged with nitrogen for about 3 min. and heated to initiate polymerization. As the reaction became exothermic the temperature control was adjusted to 70° C. and heating continued at that temperature for about 2.5 hours. The cooling condenser was replaced by a distillation condenser, and isopropanol was distilled from the reaction mixture. The resulting polymer was neutralized by addition of aqueous ammonia and water until the solution was basic.

To 30 g of the above acrylate copolymer solution (8.1 g solids, 22.5 mmoles of carboxylic groups) was added an aqueous solution of isopropenyl oxazoline/ethyl acrylate/methyl methacrylate terpolymer (85/5/10, 3.2 g solids, 24.8 mmoles of oxazoline groups, available from Nippon Shokubai Co., Ltd. as CX-WS-300™ crosslinker) followed by 2.5 g of N-methyl pyrrolidinone. The pH of the resulting solution was adjusted to 7.5–8 by adding aqueous ammonia. This formulation is hereinafter referred to as "WXF Formulation" (Waterborne Crosslinkable Fluorochemical coating system).

This WXF Formulation was allowed to sit at room temperature for about 1–2 days after which it was then coated onto a primed polyethylene terephthalate film with a #30 Mayer rod to a coating thickness of about 10–12 microns. The resulting coating was then heated in a oven at 120° C. for 30 min. The finished film was transparent and resistant to solvents and water.

The fluorine percentage of this composition was calculated as 22% from the known fluorine content of the monomers. The resulting film was evaluated using the described "pen test". The results are shown in Table 1.

Example 1

To colloidal silica (40 g solids, Ludox™ AS-40 hydrosol available from DuPont, 22 nm average particle diameter), was added concentrated aqueous ammonia (about 0.5 g), water (80 g), N-methylpyrrolidinone (26 g), and the CX-WS-300ʋ crosslinker described in Comparative Example 1 (5.2 g solids) with stirring. A translucent solution (17.5% solids) was obtained.

To the CX-WS-300™ crosslinker/SiO$_2$ solution described above (1.75 g solids, 1.55 g SiO$_2$) was added under vigorous stirring a solution of "WXF Formulation" (1.75 g solids) described in Comparative Example 1 to produce a translucent solution (17.5% solids, 44% SiO$_2$ by solids). This silica containing formulation was then coated, cured, and evaluated essentially as described in Comparative Example 1. The results of the tests are shown in Table 1.

Example 2

As in Example 1, "WXF Formulation" (3.1 g solids) was added to the translucent solution containing colloidal silica, CX-WS-300™ crosslinker, and N-methylpyrrolidinone (1.75 g solids, 1.55 g SiO$_2$) to produce a milky solution (17.5% solids, 32% SiO$_2$ by solids). This silica containing formulation was then coated, cured, and evaluated essentially as described in Comparative Example 1. The results of the tests are shown in Table 1.

Example 3

As in Example 1, "WXF Formulation" (6.7 solids) was added to the translucent solution containing colloidal silica, CX-WS-30™ crosslinker, and N-methylpyrrolidinone (1.75 g solids) to produce a translucent solution (17.5% solids, 18.4% SiO$_2$ by solids). This silica containing formulation was then coated, cured, and evaluated essentially as described in Example 1. The results of the tests are shown in Table 1.

Comparative Example 2

To a 1 L 3-necked flask equipped with a mechanical stirrer, a condenser, and a temperature control device was added 2-(N-ethylperfluorooctanesulfonamido)ethyl acrylate (120 g, available as FX-13™ acrylate from the 3M Company), 2-carboxyethyl acrylate (80 g,), mercaptopropyltrimethoxysilane (MPTS, 4.0 g, Aldrich), AIBN (1.2 g), N-methylpyrrolidinone (100 g), and isopropanol (100 g). The solution was purged with nitrogen for about 3 min. and heated to initiate the polymerization. As the reaction became exothermic the temperature control was adjusted to 70° C. and heating continued at that temperature for about 3 hours. The isopropanol was removed under reduced pressure and the resulting polymer was neutralized by addition of aqueous ammonia and water until the solution was basic.

To 40 g of the above acrylate terpolymer solution (12.0 g solids, 32.7 mmoles of carboxylic groups) was added CX-WS-300™ crosslinker (4.7 g solids, 3.6 mmoles of oxazoline groups), followed by 5.7 g of N-methyl pyrrolidinone. The pH of the solution was adjusted to 7.5–8 by adding aqueous ammonia. This formulation is referred to hereinafter as "WXF/2% MPTS Formulation" (Waterborne Crosslinkable Fluorochemical coating systems with mercaptopropyltrimethoxysilane incorporated in the polymeric chain). This formulation was evaluated essentially as described in Comparative Example 1. The test results are shown in Table 1.

Example 4

The "WXF/2% MPTS Formulation" described in Comparative Example 2 (1.75 g solids) was added to a translucent solution containing colloidal silica, CX-WS-300™ crosslinker, and N-methylpyrrolidinone (1.75 g solids) to produce a translucent solution (17.5% solids, 44% SiO$_2$ by solids). This silica containing formulation was then coated, cured, and evaluated essentially as described in Comparative Example 1. The results of the tests are shown in Table 1.

Example 5

As in Example 4, "WXF/2% MPTS Formulation" (3.1 g solids) was added to a translucent solution containing colloidal silica, CX-WS-300™ crosslinker, and N-methylpyrrolidinone (1.75 g solids) to produce a translucent solution (17.5% solids, 32% SiO$_2$ by solids). This silica containing formulation was then coated, cured, and evaluated essentially as described in Comparative Example 1. The results of the tests are shown in Table 1.

Example 6

As in Example 4, "WXF/2% MPTS Formulation" (6.7 g solids) was added to a translucent solution containing colloidal silica, CX-WS-300™ crosslinker, and N-methylpyrrolidinone (1.75 g solids) to produce a translucent solution (17.5% solids, 18.4% SiO$_2$ by solids). This silica-containing formulation was then coated, cured, and evaluated essentially as described in Comparative Example 1. The results of the tests are shown in Table 1.

Comparative Example 3

An aqueous solution of 2-(N-ethylperfluorooctanesulfonamido)ethyl acrylate (FX-13™ acrylate) and 2-isopropenyl-2-oxazoline ("IPO") copolymer (20/80 weight ratio, 1.9 g solids, 13.7 mmoles of oxazoline groups) prepared essentially according to the method described in U.S. Pat. No. 5,294,662) was mixed with an aqueous solution of FX-13™ acrylate/CEA copolymer (60/40 weight ratio, see Comparative Example 1 for preparation, 4.1 g solids, 11.3 mmoles of carboxylic acid groups), followed by addition of 2.9 g of N-methylpyrrolidinone and 26.3 g of water. The resulting solution (10% solids) was clear. This formulation was then coated, cured, and evaluated essentially as described in Comparative Example 1. The test results are shown in Table 1.

Example 7

To colloidal silica (Ludox™ AS-40 hydrosol, 1.0 g solids) was gradually added, under stirring, the formulation described in Comparative Example 3 (3.0 g of solids) to produce a translucent silica containing formulation (12.3% solids, 25% $SiO_2$ by solids). This formulation was then coated, cured, and evaluated essentially as described in Comparative Example 1. The results of the tests are shown in Table 1.

Comparative Example 4

To a 500 mL 3-necked flask equipped with a mechanical stirrer, a condenser, and a temperature control device was added $CH_2$=$CHCOOCH_2CH_2C_8F_{17}$ (54 g, available as Zonyl™ acrylate from DuPont), 2-carboxyethyl acrylate (36 g), AIBN (0.54 g), mercaptopropyltrimethoxysilane (1.8 g), N-methylpyrrolidinone (45 g), and isopropanol (45 g). The resulting solution was purged with nitrogen and heated to initiate polymerization. As the reaction became exothermic the temperature control was adjusted to 70° C. and heating continued at that temperature for about 3.5 hours. Isopropanol was removed under reduced pressure, and the resulting polymer was neutralized by addition of aqueous ammonia until the solution was basic. Part of this solution (12.9 g solids, 35 mmoles of carboxylic groups) was further mixed with CX-WS-300™ crosslinker (4.6 g solids, 35 mmoles of oxazoline group) to produce a clear coating formulation. This formulation was then coated, cured, and evaluated essentially as described in Comparative Example 1. The results of the tests are shown in Table 1.

Example 8

To colloidal silica (Ludox™ AS-40 hydrosol, 2 g solids) was added 3 drops of concentrated ammonia, 5 g of water, the coating formulation of Comparative Example 4 (5.7 g solids), and CX-WS-300™ crosslinker (0.26 g solids) with stirring to produce a silica-containing formulation (16.5% solids, 25% $SiO_2$ by solids). This formulation was then coated, cured, and evaluated essentially as described in Comparative Example 1. The results of the tests are shown in Table 1.

Comparative Example 5

To a 500 mL 3-necked flask equipped with a mechanical stirrer, a condenser, and a temperature control device was added 2-(N-methylperfluorobutanesulfonamido)ethyl acrylate (30 g), 2-carboxyethyl acrylate (20 g), AIBN (0.3 g), N-methylpyrrolidinone (20 g), and isopropanol (30 g). The solution was purged with nitrogen for about 3 min. and heated to initiate the polymerization at 70° C. for 4 hours. Isopropanol was removed under reduced pressure, and the resulting polymer was neutralized by addition of aqueous ammonia until the solution was basic. Part of this solution (12.5 g solids, 35 mmoles of carboxylic groups) was further mixed with CX-WS-300™ crosslinker, (4.5 g solids, 35 mmoles of oxazoline group) to produce a clear coating formulation. This formulation was aged at 65° C. for 5 hours and then coated, cured, and evaluated essentially as described in Comparative Example 1. The results of the tests are shown in Table 1.

Example 9

To colloidal silica (Ludox™ AS-40 hydrosol, 2 g solids) was added 3 drops of concentrated ammonia, water (4.7 g), and N-methylpyrrolidinone (0.6 g), followed by the addition of the formulation prepared in Comparative Example 5 (5.74 g solids) and CX-WS-300™ crosslinker (0.26 g solids) under stirring to produce a silica containing formulation (17.5% solids, 25% SiO2 by solids). This formulation was then coated, cured, and evaluated essentially as described in Comparative Example 1. The results of the tests are shown in Table 1.

Comparative Example 6

To a 1 L 3-necked flask equipped with a mechanical stirrer, a condenser, and a temperature control device was added 2-(N-ethylperfluorooctanesulfonamido)ethyl acrylate (70 g), methacrylic acid (30 g), AIBN (0.6 g), N-methylpyrrolidinone (40 g), and isopropanol (60 g). The solution was purged with nitrogen for about 3 min. and heated at 65° C. for 5 hours to initiate the polymerization. N-methylpyrrolidinone (10 g) was added after the polymerization. Isopropanol was removed under reduced pressure, and the resulting polymer was neutralized by addition of aqueous ammonia until the solution was basic. Part of this solution (12.7% solids, 44.3 mmoles of carboxylic groups) was further mixed with the CX-WS-300™ crosslinker (8.4 g solids, 64 mmoles of oxazoline groups) and N-methylpyrrolidinone (13.8 g) to produce a clear coating formulation. This formulation was aged at 65° C. for 5 hours and then coated, cured, and evaluated essentially as described in Comparative Example 1. The results of the tests are shown in Table 1.

Example 10

To colloidal silica (Ludox™ AS-40 hydrosol, 3.8 g solids) was added 3 drops of concentrated ammonia and water (9 g), followed by the addition of the formulation prepared in Comparative Example 6 (10.5 g) solids) with stirring to produce a silica containing formulation (11.8% solids, 25.5% $SiO_2$ by solids). This formulation was then coated, cured, and evaluated essentially as described in Comparative Example 1. The results of the tests are shown in Table 1.

TABLE 1

| Sample | Wt. % F | Wt. % SiO$_2$ | Haze %, 200 Cycles | Coating Components | ESCA C/F/Si (%) | Pen Test | Water Contact Angle (degrees) |
|---|---|---|---|---|---|---|---|
| Comparative Example 1 | 22.2 | 0 | 20 | WXF Formulation | 49/28/0 | 3 | 100 |
| Example 1 | 11.1 | 44 | 5.9 | WXF Formulation + SiO$_2$ | 39/21/7.8 | 0 | 136 |
| Example 2 | 14.2 | 32 | 9.8 | WXF Formulation + SiO$_2$ | 46/26/1.8 | 3 | 102 |
| Example 3 | 17.6 | 18.4 | 13 | WXF Formulation + SiO$_2$ | 46/28/0.6 | 3 | 104 |
| Comparative Example 2 | 21.8 | 0 | 21 | WXF/2% MPTS Formulation | 48/26/0 | 3 | 103 |
| Example 4 | 10.5 | 44 | 8.6 | WXF/2% MPTS Formulation + SiO$_2$ | 43/25/4.0 | 1 | 119 |
| Example 5 | 14.0 | 32 | 10 | WXF/2% MPTS Formulation + SiO$_2$ | 44/28/1.8 | 3 | 106 |
| Example 6 | 17.5 | 18.4 | 13 | WXF/2% MPTS Formulation + SiO$_2$ | 47/27/0.7 | 3 | 104 |
| Comparative Example 3 | 24.5 | 0 | 22 | WXF/FX-13/PIPO(20/80) | 48/26/1.4 | 3 | 94 |
| Example 7 | 18.4 | 25 | 10 | WXF/FX-13/PIPO(20/80) + SiO$_2$ | 46/26/1.5 | 3 | 100 |
| Comparative Example 4 | 27.1 | 0 | 35 | WXF/2% MPTS & Zonyl Acrylate | 47/33/0 | 3 | 108 |
| Example 8 | 19.3 | 25 | 10 | WXF/2% MPTS & Zonyl Acrylate + SiO$_2$ | 46/32/1.1 | 3 | 110 |
| Comparative Example 5 | 18.3 | 0 | 9.5 | WXF/MeFBSEA | 49/22/0 | 3 | 98 |
| Example 9 | 13.1 | 25 | 7.0 | WXF/MeFBSEA + SiO$_2$ | 46/32/1.1 | 3 | 102 |
| Comparative Example 6 | 21.8 | 0 | 16.8 | WXF/MAA | 47/32/0 | 3 | 103 |
| Example 10 | 16.2 | 25.5 | 9.2 | WXF MAA + SiO$_2$ | 46/31/0.7 | 3 | 106 |

The data in Table 1 shows that the abrasion resistance of the crosslinked coatings was significantly improved and the low surface energy essentially unaffected after the incorporation of silica. Whereas the percentage of haze for Comparative Example 1 (without silica) is 20% after 200 cycles, Example 2 (with 32% silica based on total solids) is only 9.8%. Neither the water contact angle (100 vs. 102) nor the pen test results (3 vs. 3) was substantially affected by addition of colloidal silica, even though Comparative Example 1 has a much higher fluorine level (22.2%) than that of Example 2 (14.2%). The ESCA analyses show that the surface of the coatings has much higher fluorine content and much lower silica content than would be expected when compared to the bulk calculated values. Furthermore, the abrasion resistance of the crosslinked coatings was in proportion to the silica level in the final composition (Examples 1–6).

Example 11

A sample of colloidal silica (Ludox™ TM-50 hydrosol, 12 g solids) was diluted with water to 60 g total, followed by addition of concentrated ammonia to adjust the pH to about 9. To "WXF/2% MPTS Formulation" (34.4 g solids) was added CX-WS-300™ crosslinker (1.6 g solids), followed by N-methylpyrrolidinone (1.7 g), and water (6.0 g). The two solutions were then combined to produce a final coating formulation with 25% SiO$_2$. The sample was then coated and evaluated essentially as described in Comparative Example 1. The test results are shown in Table 2.

Examples 12–14

All the samples in this group were prepared using the materials and essentially the procedures described in Example 11, but the type of colloidal silica was varied as shown in Table 2. The samples were then coated and evaluated essentially as described in Comparative Example 1. The test results are shown in Table 2.

TABLE 2

| Sample | Wt. % F | Wt. % SiO$_2$ | Haze %, 200 Cycles | Type of Colloidal Silica | ESCA C/F/Si (%) | Pen Test | Water Contact Angle (degrees) |
|---|---|---|---|---|---|---|---|
| Example 11 | 15.6 | 25 | 11.4 | Ludox™ TM-50 hydrosol, particle size: 22 nm | 46/26/1.0 | 3 | 102 |
| Example 12 | 17.2 | 18.4 | 11.6 | Ludox™ SM-30 hydrosol, particle size: 7 nm | 45/26/1.9 | 1 | 108 |
| Example 13 | 16.7 | 25 | 7.3 | Nalco™ 2329 hydrosol, particle size: 75 nm | 50/25/0 | 3 | 106 |
| Example 14 | 13.3 | 40 | 4.2 | Nalco™ 2329 hydrosol, particle size: 75 nm | 49/27/0.8 | 3 | 105 |

The data in Table 2 indicates that different brands and particle sizes of colloidal silica can be used to improve abrasion resistance of the coatings, relative to a coating that contains no colloidal silica, and still maintain low surface energy properties.

Examples 15–24

In Examples 15–24, "WXF/2% MPTS Formulation" (described above in Comparative Example 2) was utilized, along with the various different types of colloidal silica shown in Table 3 below. The resulting compositions were coated with a #15 Meyer bar onto clear PET film and were cured at 120° C. for 15 minutes. The resulting coatings were then evaluated using the above-described "pen test". The results are shown in Table 3.

Example 15

To colloidal silica (Ludox™ SM-30 hydrosol available from Du Pont, 6.0 g, 1.8 g solids) was added concentrated ammonia (1.0 g) and water (26.5 g), followed by addition of "WXF/2% MPTS Formulation" (21 g, 4.2 g solids) with stirring. The resulting composition was quite clear (composition solids: 11%; $SiO_2$ wt % based on total dry solids: 30%).

Example 16

To the composition of Example 15 (20 g) was added "WXF/2% MPTS Formulation" (22 g) to yield a clear composition (composition solids: 15.7%; $SiO_2$ wt % based on total dry solids: 10%).

Example 17

To the composition of Example 15 (20 g) was added "WXF/2% MPTS Formulation" (5.5 g) to yield a clear composition (composition solids: 12.9%; $SiO_2$ wt % based on total dry solids: 20%).

Example 18

To colloidal silica (Ludox™ HS-40 hydrosol available from Du Pont, 7.5 g, 3.0 g solids) was added concentrated ammonia (1.5 g) and water (16.0 g), followed by addition of "WXF/2% MPTS Formulation" (35.0 g, 7.0 g solids) with stirring. The resulting composition was translucent (composition solids: 16.7%; $SiO_2$ wt % based on total dry solids: 30%).

Example 19

To the composition of Example 18 (20 g) was added "WXF/2% MPTS Formulation" (16.7 g) to yield a translucent composition (composition solids: 18.2%; $SiO_2$ wt % based on total dry solids: 15%).

Example 20

To colloidal silica (Ludox™ TM-50 hydrosol available from Du Pont, 8.0 g, 4.0 g solids) was added concentrated ammonia (1.5 g) and water (20.5 g), followed by addition of "WXF/2% MPTS Formulation" (30.0 g, 6.0 g solids) with stirring. The resulting composition was translucent (composition solids: 16.7%; $SiO_2$ wt % based on total dry solids: 40%).

Example 21

To the composition of Example 20 (20 g) was added "WXF/2% MPTS Formulation" (16.7 g) to yield a translucent composition (composition solids: 18.2%; $SiO_2$ wt % based on total dry solids: 20%).

Example 22

To colloidal silica (Nalco™ 2329 hydrosol available from Nalco, Naperville, Ill., 15.0 g, 6.0 g solids) was added concentrated ammonia (2.0 g) and water (23.0 g), followed by addition of "WXF/2% MPTS Formulation" (20.0 g, 4.0 g solids) with stirring. The resulting composition was milky (composition solids: 16.7%; $SiO_2$ wt % based on total dry solids: 60%).

Example 23

To the composition of Example 22 (10 g) was added "WXF/2% MPTS Formulation" (11.8 g) to yield a milky composition (composition solids: 18.5%; $SiO_2$ wt % based on total dry solids: 25%).

Example 24

To the composition of Example 22 (25 g) was added "WXF/2% MPTS Formulation" (10.5 g) to yield a milky composition (composition solids: 17.7%; $SiO2$ Wt% based on total dry solids: 40%).

TABLE 3

| Sample | $SiO_2$ Hydrosol (particle size, (nm); specific surface area, (m²/g)) | Weight % F | $SiO_2$ Weight % (based on total solids) | $SiO_2$ Surface Area (based on total solids; (m²/g)) | Pen Test |
|---|---|---|---|---|---|
| Comparative Example 7 | — | 22.2 | 0.0 | — | 3 |
| 15 | Ludox ™ SM-30 (7; 360) | 15.5 | 30.0 | 108 | 0 |
| 16 | Ludox ™ SM-30 (7; 360) | 20.0 | 10.0 | 36 | 3 |
| 17 | Ludox ™ SM-30 (7; 360) | 17.8 | 20.0 | 72 | 2 |
| 18 | Ludox ™ HS-40 (12; 240) | 18.9 | 15.0 | 36 | 3 |
| 19 | Ludox ™ HS-40 (12; 240) | 15.5 | 30.0 | 72 | 0 |
| 20 | Ludox ™ TM-50 (22; 140) | 17.8 | 20.0 | 28 | 3 |
| 21 | Ludox ™ TM-50 (22; 140) | 13.3 | 40.0 | 48 | 0 |
| 22 | Nalco ™ 2329 (75; 40) | 16.7 | 25.0 | 10 | 3 |
| 23 | Nalco ™ 2329 (75; 40) | 13.3 | 40.0 | 16 | 3 |
| 24 | Nalco ™ 2329 (75; 40) | 8.9 | 60.0 | 24 | 0 |

The data in Table 3 indicates that in order to maintain acceptably low surface energy properties, colloidal silica can generally not be added to the flourochemical compositions in excessive amounts, as measured by the silica weight percent and/or the total surface area of added silica. The surface energy properties can also be influenced by the weight percent flourine in the compositions. It has been found that the best measure of the low surface energy properties is generally the pen test.

Various modifications and alterations of this invention will become apparent to those skilled in the art without departing from the scope and spirit of the invention.

What is claimed is:

1. A cured composition that is prepared by curing a water-based composition comprising an aqueous solution, emulsion, or dispersion of (a) a water-soluble or water-dispersible polymer or oligomer having at least one anionic moiety which is capable of reacting with an oxazoline or oxazine moiety: (b) a water-soluble or water-dispersible polymer or oligomer having at least one oxazoline or oxazine moiety; and (c) from about 15 to about 40 weight percent colloidal silica having an average particle diameter in the range of from about 20 to about 75 nanometers, said weight percent being based on the total weight of colloidal silica and polymer solids; at least one of said components (a) and (b) further comprising at least one fluoroaliphatic moiety; and said composition having a fluorine content of at least about 10 weight percent.

2. The cured composition of claim 1 wherein said cured composition exhibits a non-zero pen test value.

3. The cured composition of claim 1 comprising a crosslinked polymer containing at least one amide-ester crosslink moiety, derived from the reaction of carboxyl groups with oxazoline or oxazine moieties, and having colloidal silica integrated therein.

4. A coated article comprising the cured composition of claim 1.

5. The cured composition of claim 1 wherein said polymer or oligomer having at least one anionic moiety further comprises at least one fluoroaliphatic moiety.

6. The cured composition of claim 1 wherein said polymer or oligomer having at least one oxazoline or oxazine moiety further comprises at least one fluoroaliphatic moiety.

7. The cured composition of claim wherein said anionic moiety is a carboxylic acid or carboxylate group.

8. The cured composition of claim 1 wherein said polymer or oligomer having at least one anionic moiety comprises interpolymerized units derived from at least one fluoroaliphatic radical-containing acrylate and at least one carboxy-containing monomer.

9. The cured composition of claim 1 wherein said polymer or oligomer having at least one oxazoline or oxazine moiety comprises polymerized units derived from 2-isopropenyl-2-oxazoline.

10. The cured composition of claim 1 wherein said polymer or oligomer having at least one oxazoline or oxazine moiety comprises interpolymerized units derived from at least one aliphatic or fluoroaliphatic radical-containing acrylate and 2-isopropenyl-2-oxazoline.

* * * * *

UNITED STATES PATENT AND TRADEMARK OFFICE
CERTIFICATE OF CORRECTION

PATENT NO.   : 6,201,056 B1
DATED        : March 13, 2001
INVENTOR(S)  : Don-Wei Zhu It is certified that error appears in the above-identified patent and that said Letters Patent is hereby corrected as shown below:

Column 3,
Line 50, "4 to about carbon atoms." should read -- 4 to about 10 carbons atoms. --;

Column 7,
Line 42, "CX-WS-300ʊ" should read -- CX-WS-300™ --;

Column 8,
Line 1, "CX-WS-30™" should read -- CX-WS-300™ --;

Column 10,
Line 36, "2-(N-ethylperfluorooctanesulfonamido)ethyl" should read
-- 2-(N-ethylperfluorooctanesulfonamido) ethyl --;
Line 63, "10.5 g) solids" should read -- 10.5 g solids --;

Column 16,
Line 1, "claim wherein" should read -- claim 1 wherein --;

Signed and Sealed this

Twenty-seventh Day of August, 2002

Attest:

Attesting Officer

JAMES E. ROGAN
Director of the United States Patent and Trademark Office